US008879473B2

(12) United States Patent
Liu et al.

(10) Patent No.: US 8,879,473 B2
(45) Date of Patent: Nov. 4, 2014

(54) METHOD AND USER TERMINAL FOR MULTI-SITE MULTI-USER JOINT TRANSMISSION

(75) Inventors: Hao Liu, Shanghai (CN); Dong Li, Shanghai (CN); Yang Song, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/578,134

(22) PCT Filed: Feb. 12, 2010

(86) PCT No.: PCT/CN2010/000208
§ 371 (c)(1),
(2), (4) Date: Aug. 9, 2012

(87) PCT Pub. No.: WO2011/097768
PCT Pub. Date: Aug. 18, 2011

(65) Prior Publication Data
US 2012/0307672 A1 Dec. 6, 2012

(51) Int. Cl.
*H04W 4/00* (2009.01)
*H04B 7/04* (2006.01)
*H04B 7/02* (2006.01)

(52) U.S. Cl.
CPC ............... *H04B 7/024* (2013.01); *H04B 7/0452* (2013.01); *H04B 7/0417* (2013.01)
USPC .......... 370/328; 370/252; 455/422.1; 455/450

(58) Field of Classification Search
CPC ...... H04B 7/024; H04B 7/026; H04B 7/0626; H04B 7/0417; H04B 7/0452; H04B 7/0632; H04B 7/0634; H04B 7/063; H04B 7/0617; H04B 7/24; H04W 4/00; H04W 24/00; H04W 24/04; H04W 24/02

USPC ......... 370/338, 330, 329, 328, 312, 252, 241, 370/210; 375/296, 267, 260, 226, 219; 455/524, 501, 450, 422.1
See application file for complete search history.

(56) References Cited

U.S. PATENT DOCUMENTS

| 2011/0188393 A1* | 8/2011 | Mallik et al. .................. 370/252 |
| 2011/0206106 A1* | 8/2011 | Mallik et al. .................. 375/226 |
| 2012/0184322 A1* | 7/2012 | Falconetti et al. ............ 455/524 |

FOREIGN PATENT DOCUMENTS

| CN | 101557249 A | 10/2009 |
| CN | 101599785 A | 12/2009 |
| CN | 101599814 A | 12/2009 |

OTHER PUBLICATIONS

International Search Report for PCT/CN2010/000208 dated Nov. 18, 2010.
Notice of Reason for Refusal for corresponding Japanese Patent Application No. 2012-552225, dated Nov. 5, 2013, 4 pages.

(Continued)

*Primary Examiner* — Bob Phunkulh
*Assistant Examiner* — Walli Butt
(74) *Attorney, Agent, or Firm* — Fay Sharpe LLP

(57) ABSTRACT

The present invention proposes a method for multi-site multi-user joint transmission, the method comprising: measuring, by a user terminal, a downlink channel originated from each base station; according to the measurement for the downlink channel, quantizing and obtaining, by the user terminal, per-site channel information for the each base station and additional inter-site channel information, the additional inter-site channel information being used for calculating joint channel information of multiple base stations; and feeding back, by the user terminal, the per-site channel information for the each base station and the additional inter-site channel information so that the base station performs scheduling to execute the multi-site multi-user joint transmission.

4 Claims, 2 Drawing Sheets

(56) References Cited

OTHER PUBLICATIONS

Qualcomm Europe, "Hierarchical feedback in support of downlink CoMP operation," Document for: Discussion and Decision, 3GPP TSG-RAN WG1 #S6bis, Mar. 23-27, 2009, Seoul, South Korea, 5 pages.

Samsung, "Discussion on CoMP with Implicit CQI Feedback," Document for: Discussion and Decision, 3GPP TSG RAN WG1 Meeting #56bis, Miyazaki, Japan, Oct. 12-Oct. 16, 2009, 7 pages.

Notice of Preliminary Rejection for corresponding Korean Patent Application No. 10-2012-7023619, dated Feb. 18, 2014, 8 pages.

Alcatel-Lucent Shanghai Bell, "Feedback overhead for DL CoMP," R1-100425, Document for: Discussion, 3GPP TSG RAN WG1 Meeting #59bis, Valencia, Spain, Jan. 18-22, 2010, 9 pages.

Alcatel-Lucent Shanghai Bell, "Feedback overhead for DL CoMP," R1-100720, Document for: Discussion/decision, 3GPP TSG RAN WG1 Meeting #59bis, Valencia, Spain, Jan. 18-22, 2010, 8 pages.

* cited by examiner

METHOD AND USER TERMINAL FOR MULTI-SITE MULTI-USER JOINT TRANSMISSION

FIELD OF THE INVENTION

The present invention relates to the field of mobile communications, and specifically to a method and a user terminal for multi-site multi-user joint transmission, which can not only provide an advantageous system performance gain but also have an excellent backward compatibility with the scheduling and transmission of MU-MIMO or some other sub-optimal multi-site coordination schemes.

BACKGROUND OF THE INVENTION

Coordinated multi-point (CoMP) transmission is a very promising technique for an LTE-Advanced communication system to effectively reduce inter-cell interference (ICI) and improve the coverage of high data rates and cell-edge throughput and/or increase system throughput. Multi-site joint transmission (JT) is one of CoMP schemes, where data transmission intended for one or more UEs is shared within a CoMP cooperating set and is jointly processed among multiple cells. Channel information of all the UEs is acquired and shared through channel quantization feedback and backhaul exchange. Therefore, joint multi-site proportional fair (PF) scheduling and centralized zero-forcing (ZF) precoding can be performed among the coordinated eNBs or in a centralized scheduler. Multiple UEs can be jointly served by multiple eNBs in the CoMP cooperating set through coherent transmission so as to improve signal power and reduce inter-cell interference (ICI). It is obviously that channel information feedback is an important factor in the multi-site joint transmission scheme.

Therefore, there is a need for an efficient channel feedback mechanism, which can not only fully support multi-site joint transmission, but also have satisfactory backward compatibility with single cell SU/MU-MIMO (single user/multi-user multiple-input and multiple-output) or sub-optimal multi-site coordination schemes such as coordinated scheduling/coordinated beamforming etc.

The multi-site joint transmission scheme highly depends on channel information feedback from each UE. Each UE can report only one component channel information from multiple coordinated eNBs. In this way, a larger codebook size with a more transmit antenna number should be designed to better quantize the component channel information. On the other hand, if only the component channel information is fed back, the eNB cannot perform such schemes as single-cell SU/MU-MIMO scheduling or coordinated scheduling/beamforming etc. any more. Therefore a more efficient feedback mechanism should be explored during the design of the multi-site joint transmission scheme.

SUMMARY OF THE INVENTION

The present invention is proposed to overcome the above drawbacks in the prior art. Hence, an object of the present invention is to provide a method and a user terminal for multi-site multi-user joint transmission, which can not only provide an advantageous system performance gain but also have an excellent backward compatibility with the scheduling and transmission of MU-MIMO or some other sub-optimal multi-site coordination schemes.

In order to achieve the above object, the present invention provides a method for multi-site multi-user joint transmission, comprising: measuring, by a user terminal, a downlink channel originated from each base station; according to the measurement for the downlink channel, quantizing and obtaining, by the user terminal, per-site channel information for the each base station and additional inter-site channel information, the additional inter-site channel information being used for calculating joint channel information for multiple base stations; and feeding back, by the user terminal, the per-site channel information for the each base station and the additional inter-site channel information so that the base station performs scheduling to execute the multi-site multi-user joint transmission.

Preferably, the per-site channel information comprises per-site channel direction information and per-site channel quality information.

Preferably, the additional inter-site channel information comprises inter-site relative phase information, inter-site relative amplitude information and additional channel quality information.

Preferably, the joint channel information comprises joint channel direction information and joint channel quality information.

Preferably, the joint channel direction information for multiple base stations is synthesized according to the per-site channel direction information, the inter-site relative phase information and the inter-site relative amplitude information for the multiple base stations.

Preferably, the joint channel quality information for multiple base stations is synthesized according to the per-site channel quality information and the additional channel quality information for the multiple base stations.

Besides, in order to achieve the above object, the present invention provides a user terminal for multi-site multi-user joint transmission, comprising: a measuring device configured to measure a downlink channel originated from each base station; a quantizing and obtaining device configured to, according to the measurement for the downlink channel, quantize and obtain per-site channel information for each base station and additional inter-site channel information, wherein the additional inter-site channel information is used for calculating joint channel information for multiple base stations; and a feedback device configured to feed back the per-site channel information for each base station and the additional inter-site channel information so that the base station performs scheduling to execute the multi-site multi-user joint transmission.

BRIEF DESCRIPTION OF THE DRAWINGS

The above and other objects, features and advantages of the present invention will be made more apparent by describing in detail non-limiting embodiments of the present invention with reference to the drawings, wherein.

DETAILED DESCRIPTION OF EMBODIMENTS

Hereinafter, the present invention will be described with reference to the drawings. In the following description, some specific embodiments are only described for illustrative purposes and they should not be construed as any limitation to the present invention, but only as examples. Traditional structures or architectures, which will potentially blur the understanding of the present invention, will be omitted.

The present invention provides a multi-site multi-user joint transmission scheme based on per-site channel feedback and additional inter-site channel feedback. Each UE reports multiple per-site channel quantization information and per-site channel quality information (CQI) from each coordinated eNB. Based on these kinds of feedback information, the eNB can perform single-cell SU/MU-MIMO scheduling or some other sub-optimal multi-site scheduling and transmission. If more promising multi-site joint transmission is executed in the eNB side or in a centralized scheduler, only some inter-site spatial characters (e.g.: inter-site relative phase or amplitude) among the coordinated eNBs need to be fed back additionally on top of the per-site channel feedback. When possessing the per-site channel feedback and the additional inter-site channel feedback simultaneously, the coordinated eNBs or the centralized scheduler can carry out the multi-site multi-user joint transmission easily or even more flexible switching among single-cell SU/MU-MIMO, coordinated scheduling/coordinated beamforming and the multi-site joint transmission mechanism.

Figure 1:
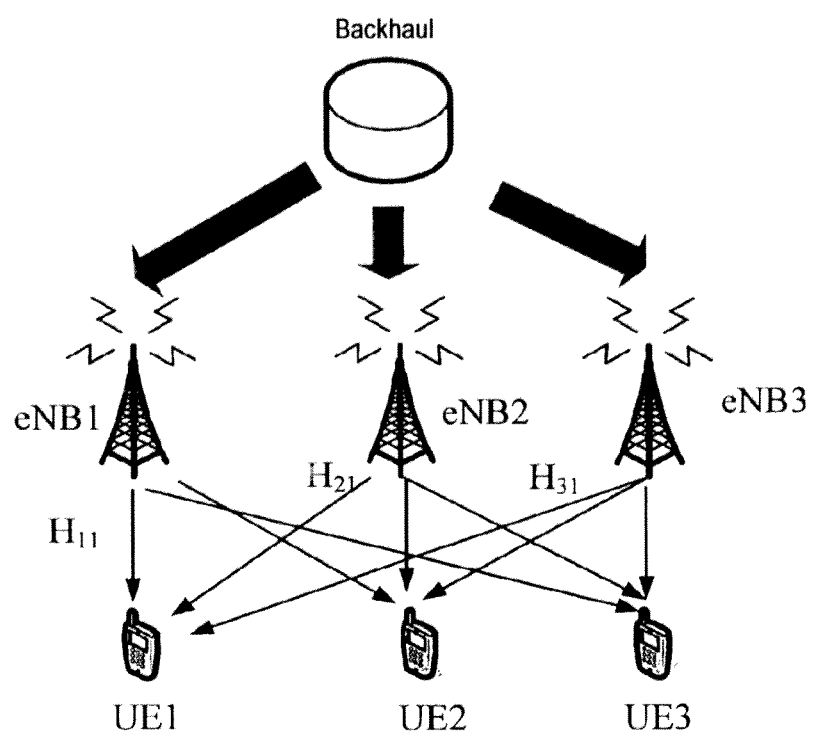
FIG. 1 illustrates a schematic diagram of a system for a multi-site multi-user joint transmission according to the present invention.

For the sake of description simplicity, three coordinated eNBs are assumed to serve multiple UEs simultaneously, as shown in FIG. 1. The detailed implementation procedures are described as follows:

STEP 1: Downlink Channel Measurement and Quantization

Each UE detects a downlink (DL) channel according to DL (downlink) common reference signals from coordinated eNBs. For example, UE1 obtains a DL channel matrix $H_{i1}$ from eNBi (i=1, 2, 3) to the UE1, and eNB1 is the serving eNB for the UE1.

Perform receiver beamforming for each DL channel $H_{i1}$:

$$h_{i1} = U(:,1)^H H_{i1},$$

where $U(:,1)$ is the first column of the left singular vector of channel matrix $h_{11}$ from the serving eNB1.

Perform channel normalization for the above equivalent channel:

$$\tilde{h}_{i1} = \frac{h_{i1}}{\|h_{i1}\|_F},$$

where $\|\cdot\|_F$ denotes the Frobenius norm of a matrix.

Perform channel quantization of the above normalized channel according to minimum chordal distance:

$$\hat{h}_{i1} = \underset{\{c_j^T\}j=1,\ldots,N}{\operatorname{argmax}} |\tilde{h}_{i1} c_j^*|,$$

where $c_j$ is a codebook (or a transformed codebook weighted by a spatial correlation matrix of UE1) of unit-norm column vectors of a size $N=2^B$, $C=\{c_1, \ldots, c_N\}$.

STEP 2: Channel Direction Information (CDI) Quantization and Feedback

Three types of per-site channel $\hat{h}_{i1}$ are reported to the serving eNB according to the above step. However, in order to support multi-site joint transmission, inter-site spatial characters (e.g.: inter-site phase information, inter-site amplitude information, etc.) should also be reported to the serving eNB additionally.

A joint normalized channel vector from the three coordinated eNBs to the UE1 is:

$$\tilde{h}_1 = \frac{h_1}{\|h_1\|_F} = \frac{[h_{11} h_{21} h_{31}]}{\|h_1\|_F},$$

where $$\|h_1\|_F = \sqrt{\|h_{11}\|_F^2 + \|h_{21}\|_F^2 + \|h_{31}\|_F^2}.$$

A joint quantized channel vector from the three coordinated eNBs to the UE1 can be determined by considering the inter-site spatial characters:

$$\hat{h}_1 = \frac{[\|h_{11}\|_F \hat{h}_{11}, \|h_{21}\|_F \hat{h}_{21} e^{j\phi_1}, \|h_{31}\|_F \hat{h}_{31} e^{j\phi_2}]}{\|h_1\|_F}$$

$$= [\alpha_1 \hat{h}_{11}, \alpha_2 \hat{h}_{21} e^{j\phi_1}, \alpha_3 \hat{h}_{31} e^{j\phi_2}],$$

where:

1) inter-site amplitude information $\alpha_1, \alpha_2, \alpha_3 \in (0, 1)$ can be determined as follows, and can be quantized within the range of $(0, 1)$, $$\alpha_i = \frac{\|h_{i1}\|_F}{\|h_1\|_F} \ \& \ \sum_{i=1}^{3} \alpha_i^2 = 1$$

2) inter-site phase information $\phi_1, \phi_2 \in (0, 2\pi)$ can be determined according to $$\text{optimal}[\phi_1, \phi_2] =$$

$$\underset{\phi_1,\phi_2}{\operatorname{argmax}} |\tilde{h}_1 \hat{h}_1^H| = \underset{\phi_1,\phi_2}{\operatorname{argmax}} \left| \frac{[h_{11} h_{21} h_{31}]}{\|h_1\|_F} [\alpha_1 \hat{h}_{11}, \alpha_2 \hat{h}_{21} e^{j\phi_1}, \alpha_3 \hat{h}_{31} e^{j\phi_2}]^H \right|.$$

It is supposed that a UE can measure and calculate the following information:

$$h_{11} \hat{h}_{11}^H = \|g_{11}\|_F |\tilde{h}_{11} \hat{h}_{11}^H| e^{j\psi_1},$$
$$h_{21} \hat{h}_{21}^H = \|h_{21}\|_F |\tilde{h}_{21} \hat{h}_{21}^H| e^{j\psi_2},$$
$$h_{31} \hat{h}_{31}^H = \|h_{31}\|_F |\tilde{h}_{31} \hat{h}_{31}^H| e^{j\psi_3},$$

where $\psi_i$ is the phase information of a complex scalar $\tilde{h}_{i1} \hat{h}_{i1}^H$, i=(1, 2, 3), and $|\tilde{h}_{i1} \hat{h}_{i1}^H|$ its amplitude information.

Then, $$|\tilde{h}_1 \hat{h}_1^H| = \left| \frac{[h_{11} h_{21} h_{31}]}{\|h_1\|_F} [\alpha_1 \hat{h}_{11}, \alpha_2 \hat{h}_{21} e^{j\phi_1}, \alpha_3 \hat{h}_{31} e^{j\phi_2}]^H \right| =$$

$$\frac{1}{\|h_1\|_F} \left| \alpha_1 h_{11} \hat{h}_{11}^H + \alpha_2 h_{21} \hat{h}_{21}^H e^{-j\phi_1} + \alpha_3 h_{31} \hat{h}_{31}^H e^{-j\phi_2} \right| =$$

$$\frac{1}{\|h_1\|_F} \left| \alpha_1 \|h_{11}\|_F |\tilde{h}_{11} \hat{h}_{11}^H| e^{j\psi_1} + \alpha_2 \|h_{21}\|_F |\tilde{h}_{21} \hat{h}_{21}^H| e^{j\psi_2} e^{-j\phi_1} + \alpha_3 \|h_{31}\|_F |\tilde{h}_{31} \hat{h}_{31}^H| e^{j\psi_3} e^{-j\phi_2} \right| =$$

$$\frac{1}{\|h_1\|_F} \left| \alpha_1 \|h_{11}\|_F |\tilde{h}_{11} \hat{h}_{11}^H| + \alpha_2 \|h_{21}\|_F |\tilde{h}_{21} \hat{h}_{21}^H| e^{j(\psi_2 - \psi_1 - \phi_1)} + \right.$$

-continued $$\alpha_3 \|h_{31}\|_F \left| \tilde{h}_{31} \hat{h}_{31}^H \right| e^{j(\psi_3 - \psi_1 - \phi_2)} \right| \leq$$

$$\frac{1}{\|h_1\|_F} \left( \alpha_1 \|h_{11}\|_F \left| \tilde{h}_{11} \hat{h}_{11}^H \right| + \alpha_2 \|h_{21}\|_F \left| \tilde{h}_{21} \hat{h}_{21}^H \right| + \alpha_3 \|h_{31}\|_F \left| \tilde{h}_{31} \hat{h}_{31}^H \right| \right)$$

When and only when:

$$\phi_1 = \psi_2 - \psi_1, \phi_2 = \psi_3 - \psi_1$$

$|\tilde{h}_1 \hat{h}_1^H|$ can reach the maximum value, and inter-site phase information $(\phi_1, \phi_2)$ can be quantized within the range of $(0, 2\pi)$.

In summary, the UE needs to feedback the following CDI related information:
1) three per-site channel feedback, $(\hat{h}_{11}, \hat{h}_{21}, \hat{h}_{31})$,
2) two inter-site phase information feedback, $(\phi_1, \phi_2)$, $$\phi_1 = \psi_2 - \psi_1, \phi_2 = \psi_3 - \omega_1,$$

where:

$$h_{11} \hat{h}_{11}^H = \|h_{11}\|_F |\tilde{h}_{11} \hat{h}_{11}^H| e^{j\psi_1},$$
$$h_{21} \hat{h}_{21}^H = \|g_{21}\|_F |\tilde{h}_{21} \hat{h}_{21}^H| e^{j\psi_2},$$
$$h_{31} \hat{h}_{31}^H = \|h_{31}\|_F |\tilde{h}_{31} \hat{h}_{31}^H| e^{j\psi_3},$$

3) two inter-site amplitude information feedback, $(\alpha_2, \alpha_3)$, $$\alpha_i = \frac{\|h_{i1}\|_F}{\|h_1\|_F} \ \& \ \sum_{i=1}^{3} \alpha_i^2 = 1.$$

STEP 3: Channel Quality Information (CQI) Quantization and Feedback

According to the per-site channel measurement and quantization in step 1, the per-site CQI from each coordinated eNB to the UE1 can be determined as:

$$CQI_{11} = \frac{\frac{P}{M} \|h_{11}\|_F^2 \cos^2 \theta_{11}}{P_{IN1} + \frac{P}{M} \|h_{11}\|_F^2 \sin^2 \theta_{11}} = \frac{\|h_{11}\|_F^2 \cos^2 \theta_{11}}{P_{IN1} + \|h_{11}\|_F^2 \sin^2 \theta_{11}} \quad (1)$$

$$CQI_{21} = \frac{\frac{P}{M} \|h_{21}\|_F^2 \cos^2 \theta_{21}}{P_{IN1} + \frac{P}{M} \|h_{21}\|_F^2 \sin^2 \theta_{21}} = \frac{\|h_{21}\|_F^2 \cos^2 \theta_{21}}{P_{IN1} + \|h_{21}\|_F^2 \sin^2 \theta_{21}}$$

$$CQI_{31} = \frac{\frac{P}{M} \|h_{31}\|_F^2 \cos^2 \theta_{31}}{P_{IN1} + \frac{P}{M} \|h_{31}\|_F^2 \sin^2 \theta_{31}} = \frac{\|h_{31}\|_F^2 \cos^2 \theta_{31}}{P_{IN1} + \|h_{31}\|_F^2 \sin^2 \theta_{31}}$$

where:
1) the channel amplitude from the coordinated eNBi (i=1, 2, 3) to the UE1 is $\|h_{i1}\|_F$,
2) the angle of channel information and channel quantization from the coordinated eNBi (i=1, 2, 3) to the UE1 is $\theta_{i1}$ $$\cos \theta_{11} = |\tilde{h}_{11} \hat{h}_{11}^H|$$

$$\cos \theta_{21} = |\tilde{h}_{21} \hat{h}_{32}^H|$$

$$\cos \theta_{31} = |\tilde{h}_{31} \hat{h}_{31}^H|,$$

3) the measured power of noise and interfering cells (excluding eNB2 and eNB3) of UE1 is $P_{IN1}$, and 4) P is a per-cell power constraint, M is a per-cell transmit antenna number, and usually it can be set as $$\frac{P}{M} = 1.$$

Multi-site CQI reflecting a joint channel from all the coordinated eNBs to the UE1 should be determined according to per-site CQI feedback. The detailed derivation processes of multi-site CQI have been listed as follows.

According to joint normalized channel vector $\tilde{h}_1$ and joint quantized channel vector $\hat{h}_1$ in step 2, the multi-site CQI from all the coordinated eNBs to the UE1 can be expressed as per-site CQI:

$$CQI_1 = \frac{\frac{3P}{3M} \|h_1\|_F^2 \cos^2 \theta_1}{P_{IN1} + \frac{3P}{3M} \|h_1\|_F^2 \sin^2 \theta_1} = \frac{\|h_1\|_F^2 \cos^2 \theta_1}{P_{IN1} + \|h_1\|_F^2 \sin^2 \theta_1} \quad (2)$$

where:
1) the joint channel amplitude from all the coordinated eNBs to the UE1 is $$\|h_1\|_F = \sqrt{\|h_{11}\|_F^2 + \|h_{21}\|_F^2 + \|h_{31}\|_F^2}, \text{ and}$$

2) the angle of a joint channel vector $\tilde{h}_1$ and a joint quantized channel vector $\hat{h}_1$ is $\theta_1$.

According to the inter-site phase and amplitude information, the angle $\theta_1$ can be derived as:

$$\cos \theta_1 = \quad (3)$$

$$\left| \tilde{h}_1 \hat{h}_1^H \right| = \left| [\alpha_1 \tilde{h}_{11}, \alpha_2 \tilde{h}_{21}, \alpha_3 \tilde{h}_{31}] [\alpha_1 \hat{h}_{11}, \alpha_2 \hat{h}_{21} e^{j\phi_1}, \alpha_3 \hat{h}_{31} e^{j\phi_2}]^H \right| =$$

$$\left| \alpha_1^2 \tilde{h}_{11} \hat{h}_{11}^H + \alpha_2^2 \tilde{h}_{21} \hat{h}_{21}^H e^{-j\phi_1} + \alpha_3^2 \tilde{h}_{31} \hat{h}_{31}^H e^{-j\phi_2} \right| = \alpha_1^2 \left| \tilde{h}_{11} \hat{h}_{11}^H \right| +$$

$$\alpha_2^2 \left| \tilde{h}_{21} \hat{h}_{21}^H \right| + \alpha_3^2 \left| \tilde{h}_{31} \hat{h}_{31}^H \right| = \alpha_1^2 \cos \theta_{11} + \alpha_2^2 \cos \theta_{21} + \alpha_3^2 \cos \theta_{31}$$

The per-site CQI in equation (1) can be transformed into the following form:

$$\cos \theta_{11} = \frac{\sqrt{P_{IN1} + \|h_{11}\|_F^2}}{\|h_{11}\|_F} \gamma_{11} \quad (4)$$

$$\cos \theta_{21} = \frac{\sqrt{P_{IN1} + \|h_{21}\|_F^2}}{\|h_{21}\|_F} \gamma_{21}$$

$$\cos \theta_{31} = \frac{\sqrt{P_{IN1} + \|h_{31}\|_F^2}}{\|h_{31}\|_F} \gamma_{31}$$

where:

$$\gamma_{11}^2 = \frac{CQI_{11}}{1 + CQI_{11}},$$

$$\gamma_{21}^2 = \frac{CQI_{21}}{1 + CQI_{21}},$$

$$\gamma_{31}^2 = \frac{CQI_{31}}{1 + CQI_{31}}.$$

The multi-site CQI in equation can be transformed into the following form:

$$\cos\theta_1 = \frac{\sqrt{P_{IN1} + \|h_1\|_F^2}}{\|h_1\|_F}\gamma_1 \quad (5)$$

where:

$$\gamma_1^2 = \frac{CQI_1}{1 + CQI_1}.$$

Put equation (4) and (5) into equation (3):

$$\frac{\sqrt{P_{IN1} + \|h_1\|_F^2}}{\|h_1\|_F}\gamma_1 = \alpha_1^2 \frac{\sqrt{P_{IN1} + \|h_{11}\|_F^2}}{\|h_{11}\|_F}\gamma_{11} + \quad (6)$$

$$\alpha_2^2 \frac{\sqrt{P_{IN1} + \|h_{21}\|_F^2}}{\|h_{21}\|_F}\gamma_{21} + \alpha_3^2 \frac{\sqrt{P_{IN1} + \|h_{31}\|_F^2}}{\|h_{31}\|_F}\gamma_{31}$$

then, $$\gamma_1 = \alpha_1 \sqrt{\frac{P_{IN1} + \|h_{11}\|_F^2}{P_{IN1} + \|h_1\|_F^2}}\gamma_{11} +$$

$$\alpha_2 \sqrt{\frac{P_{IN1} + \|h_{21}\|_F^2}{P_{IN1} + \|h_1\|_F^2}}\gamma_{21} + \alpha_3 \sqrt{\frac{P_{IN1} + \|h_{31}\|_F^2}{P_{IN1} + \|h_1\|_F^2}}\gamma_{31} =$$

$$\alpha_1 \sqrt{\frac{P_{IN1}/\|h_1\|_F^2 + \alpha_1^2}{P_{IN1}/\|h_1\|_F^2 + 1}}\gamma_{11} + \alpha_2 \sqrt{\frac{P_{IN1}/\|h_1\|_F^2 + \alpha_2^2}{P_{IN1}/\|h_1\|_F^2 + 1}}\gamma_{21} +$$

$$\alpha_3 \sqrt{\frac{P_{IN1}/\|h_1\|_F^2 + \alpha_3^2}{P_{IN1}/\|h_1\|_F^2 + 1}}\gamma_{31} = \alpha_1 \sqrt{\frac{1/CQI_{additional} + \alpha_1^2}{1/CQI_{additional} + 1}}\gamma_{11} +$$

$$\alpha_2 \sqrt{\frac{1/CQI_{additional} + \alpha_2^2}{1/CQI_{additional} + 1}}\gamma_{21} + \alpha_3 \sqrt{\frac{1/CQI_{additional} + \alpha_3^2}{1/CQI_{additional} + 1}}\gamma_{31}$$

where:

$$CQI_{additional} = \|h_1\|_F^2/P_{IN1}.$$

According to equation (6), the multi-site CQI (or $CQI_1$) from all the coordinated eNBs to the UE1 can be obtained in eNB side based on the following feedback information from UE side:
1) per-site CQI (or $CQI_{i1}$) from all coordinated eNBs to UE1,
2) inter-site relative amplitude information (or $\alpha_i$), and
3) additional CQI information (or $CQI_{additional}$).

In summary, the UE needs to feedback the following CQI related information:
1) three per-site CQI feedback, ($CQI_{11}$, $CQI_{21}$, $CQI_{31}$), and
2) one additional CQI feedback, $CQI_{additional}$.

STEP 4: Downlink CDI/CQI Exchange Among Coordinated eNBs Through Backhaul

Each eNB exchanges channel direction information (CDI) and channel quality information (CQI) of all UEs through backhaul with each other within a CoMP cooperating set. For example, all the related information is listed as follows:
1) three per-site CDI feedback, ($\hat{h}_{11}$, $\hat{h}_{21}$, $\hat{h}_{31}$),
2) two inter-site phase information feedback, ($\phi_1,\phi_2$),
3) two inter-site amplitude information feedback, ($\alpha_2,\alpha_3$),
4) three per-site CQI feedback, ($CQI_{11}$, $CQI_{21}$, $CQI_{31}$), and
5) one additional CQI feedback, $CQI_{additional}$.

STEP 5: Centralized MU-MIMO Scheduling within a Comp Cooperating Set

According to the above exchanged CDI/CQI of three coordinated eNBs, greedy search scheduling is performed by some coordinated eNBs or a centralized scheduler, and ZF beamforming is used for joint multi-site precoding.
For example, if a scheduled user set S includes the UE1, cardinality of the set S is |S|, and $f_1$ is the precoding vector of the UE1 according to the ZF beamforming, SINR of the UE1 can be estimated by the eNB as follows according to UE feedback:

$$SINR_1 \approx \frac{3M}{|S|\|f_1\|_F^2}CQI_1,$$

where $CQI_1$ is multi-site CQI from all the coordinated eNBs to the UE1, and can be calculated as follows:

$$\sqrt{\frac{CQI_1}{1 + CQI_1}} = \alpha_1 \sqrt{\frac{1/CQI_{additional} + \alpha_1^2}{1/CQI_{additional} + 1}} \sqrt{\frac{CQI_{11}}{1 + CQI_{11}}} +$$

$$\alpha_2 \sqrt{\frac{1/CQI_{additional} + \alpha_2^2}{1/CQI_{additional} + 1}} \sqrt{\frac{CQI_{21}}{1 + CQI_{21}}} +$$

$$\alpha_3 \sqrt{\frac{1/CQI_{additional} + \alpha_3^2}{1/CQI_{additional} + 1}} \sqrt{\frac{CQI_{31}}{1 + CQI_{31}}}$$

A proper MCS level can be determined at the eNB side according to the above estimated SINR for each scheduled UE.

Figure 2:
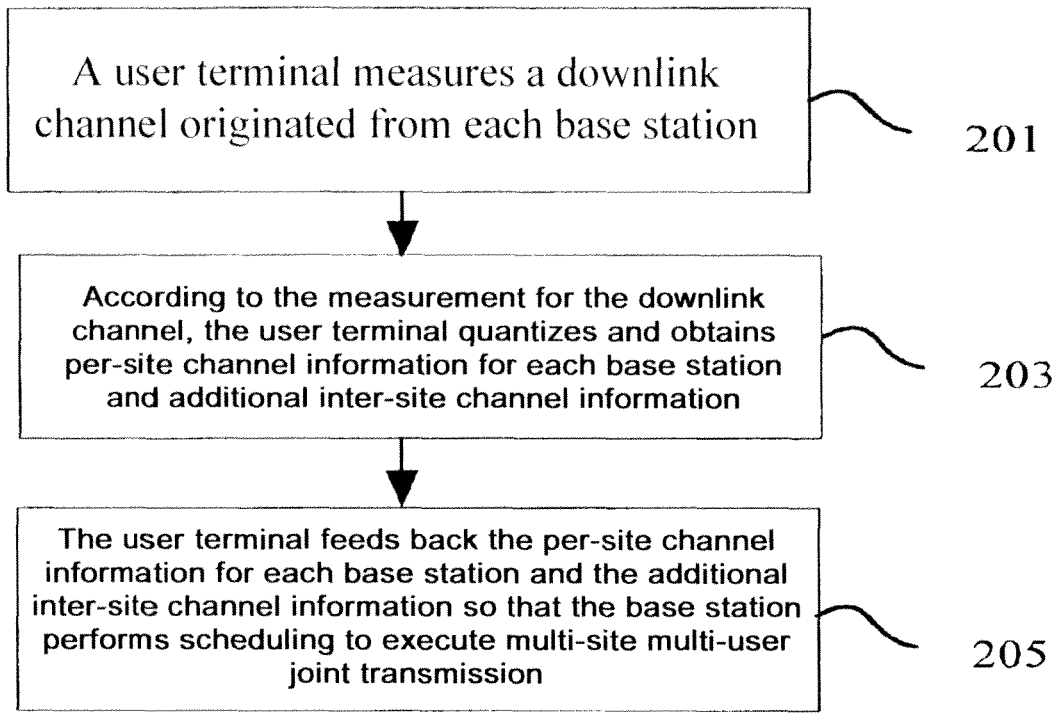
FIG. 2 illustrates a flow chart of a method for a multi-site multi-user joint transmission according to the present invention.

FIG. 2 illustrates a flow chart of a method for a multi-site multi-user joint transmission according to the present invention.

As shown in FIG. 2, according to the method of the present invention, at step 201, a user terminal measures a downlink channel originated from each base station. At step 203, according to the measurement for the downlink channel, the user terminal quantizes and obtains per-site channel information for each base station and additional inter-site channel information, the additional inter-site channel information being used for calculating joint channel information for multiple base stations. At step 205, the user terminal feeds back the per-site channel information for each base station and the additional inter-site channel information so that the base station performs scheduling to execute the multi-site multi-user joint transmission.

Figure 3:
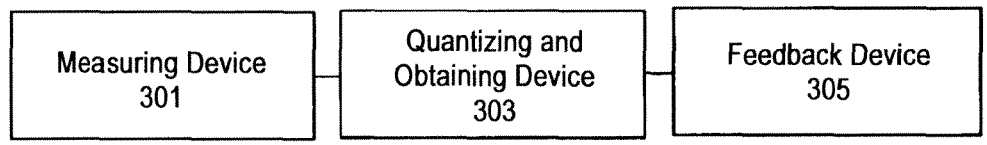
FIG. 3 illustrates a block diagram of a user terminal for a multi-site multi-user joint transmission according to the present invention.

FIG. 3 illustrates a block diagram of a user terminal for a multi-site multi-user joint transmission according to the present invention.

As shown in FIG. 3, the user terminal according to the present invention comprises: a measuring device 301, a quantizing and obtaining device 303 and a feedback device 305.

The measuring device 301 is configured to measure a downlink channel originated from each base station. The quantizing and obtaining device 303 is configured to, according to the measurement for the downlink channel, quantize and obtain per-site channel information for each base station and additional inter-site channel information, where the additional inter-site channel information being used for calculating joint channel information for multiple base stations. The feedback device 305 is configured to feed back the per-site channel information for each base station and the additional inter-site channel information so that the base station performs scheduling to execute the multi-site multi-user joint transmission.

System performance evaluations through system level simulations

System performance evaluations are focused on an FDD system. DL ZF precoding is based on channel direction information (CDI) feedback from a UE. Joint scheduling and coherent transmission are performed in three cells located in the same site. 4×2 Tx/Rx antenna deployment is assumed. Baseline single cell MU-MIMO is 1-stream transmission with Rel-8 codebook quantization or transformed codebook quantization. Multi-site multi-user joint transmission (MU JT) is assumed to schedule maximum 12 UEs at the same time, and each UE has only one stream. Detailed simulation parameters are listed in Table 1.

It can be verified by system level simulations that the multi-site multi-user joint transmission (MU JT) has shown a very superior system performance gain over the MU-MIMO scheme. In Table 2 and Table 3, a Rel-8 codebook set or a transformed codebook set is used for channel quantization respectively for the MU-MIMO scheme or the multi-site joint transmission scheme, and it can be seen that the MU JT scheme has achieved a more than 10% average cell throughput gain and a cell-edge throughput gain compared with the MU-MIMO scheme.

TABLE 1

Simulation parameters

| Parameter | Assumption |
|---|---|
| Duplex method | FDD |
| Scenario | UMi with inter-site distance of 200 meters |
| DL transmission scheme | MU-MIMO: ZF based precoding, max. 4 UEs, rank 1 per UE |
| | MU JT: intra-site clustering, ZF based precoding, max. 12 UEs, rank 1 per UE |
| PMI/CQI measurement and feedback | Ideal measurement |
| | 5-subframe feedback period for PMI/CQI |
| | 20-subframe feedback period for covariance matrix R (w/o quantization) |
| | 6-subframe feedback delay |
| Channel estimation error | Ideal |
| UE speed | 3 km/h |
| Scheduler | Greedy search algorithm based on PF |
| Link to system mapping | RBIR |
| Control overhead | Fixed 0.3063 |

TABLE 2

System level simulation with Rel-8 codebook quantization

| Transmit scheme | Cell average Spectral Efficiency (SE) (bps/Hz/cell) | Cell-edge SE (bps/Hz) |
|---|---|---|
| MU-MIMO | 2.85 (1.00) | 0.090 (1.00) |
| MU JT | 3.11 (1.09) | 0.100 (1.11) |

TABLE 3

System level simulation results with transformed codebook quantization

| Transmit scheme | Cell average SE (bps/Hz/cell) | Cell-edge SE (bps/Hz) |
|---|---|---|
| MU-MIMO | 3.59 (1.00) | 0.098 (1.00) |
| MU JT | 4.06 (1.13) | 0.108 (1.10) |

In the present invention, a multi-site multi-user joint transmission scheme is proposed based on per-site channel feedback and additional inter-site channel feedback from a UE. By using per-site channel quantization information and per-site CQI, an eNB can perform single-cell SU/MU-MIMO scheduling or scheduling and transmission of some other sub-optimal multi-site coordination schemes. If using extended inter-site phase feedback or inter-site amplitude feedback additionally, some coordinated eNBs or a centralized scheduler can perform multi-site multi-user joint transmission. The system level simulations have shown that the proposed multi-site joint transmission scheme not only has a superior system performance gain, but also has good backward compatibility with the MU-MIMO or other sub-optimal scheduling and transmission.

Compared with single-cell MU-MIMO, this scheme can achieve an explicit joint multi-user scheduling gain and a joint transmission gain. Compared with the current multi-site multi-user joint transmission scheme, the method according to the present invention has good backward compatibility with the MU-MIMO or other sub-optimal scheduling and transmission.

The above embodiments are only described for exemplary purposes, not intended to limit the present invention. A person skilled in the art should understand that various modifications and substitutions to the embodiments are allowed without departing from the scope and spirit of the present invention, and these modifications and substitutions fall within the scope as limited by the appended claims.

What is claimed is:

1. A method for multi-site multi-user joint transmission, comprising:

measuring, by a user terminal, a downlink channel originated from each base station;

according to the measurement for the downlink channel, quantizing and obtaining, by the user terminal, per-site channel information for the each base station and additional inter-site channel information, said additional inter-site channel information being used for calculating joint channel information for multiple base stations; and feeding back, by the user terminal, the per-site channel information for the each base station and the additional inter-site channel information so that the base station performs scheduling to execute the multi-site multi-user joint transmission;

wherein said per-site channel information comprises per-site channel direction information and per-site channel quality information;

wherein said additional inter-site channel information comprises inter-site relative phase information, inter-site relative amplitude information and additional channel quality information;

wherein said joint channel information comprises joint channel direction information and joint channel quality information;

wherein the joint channel direction information for the multiple base stations is synthesized according to the per-site channel direction information, the inter-site relative phase information and the inter-site relative amplitude information for the multiple base stations.

2. The method according to claim 1, wherein the joint channel quality information for the multiple base stations is synthesized according to the per-site channel quality information and the additional channel quality information for the multiple base stations.

3. A user terminal for multi-site multi-user joint transmission, comprising:

a measuring processor configured to measure a downlink channel originated from each base station;

a quantizing and obtaining processor configured to, according to the measurement for the downlink channel, quantize and obtain per-site channel information for each base station and additional inter-site channel information, wherein said additional inter-site channel information is used for calculating joint channel information for multiple base stations; and a feedback processor configured to feed back the per-site channel information for the each base station and the additional inter-site channel information so that the base station performs scheduling to execute the multi-site multi-user joint transmission;

wherein said per-site channel information comprises per-site channel direction information and per-site channel quality information;

wherein said additional inter-site channel information comprises inter-site relative phase information, inter-site relative amplitude information and additional channel quality information;

wherein said joint channel information comprises joint channel direction information and joint channel quality information;

wherein the joint channel direction information for the multiple base stations is synthesized according to the per-site channel direction information, the inter-site relative phase information and the inter-site relative amplitude information for the multiple base stations.

4. The user terminal according to claim 3, wherein the joint channel quality information for the multiple base stations is synthesized according to the per-site channel quality information and the additional channel quality information for the multiple base stations.

* * * * *